United States Patent
Zhao et al.

(10) Patent No.: US 9,939,649 B2
(45) Date of Patent: Apr. 10, 2018

(54) DISPLAY ADJUSTMENT METHODS AND HEAD-MOUNTED DISPLAY DEVICES

(71) Applicant: SHENZHEN ROYOLE TECHNOLOGIES CO. LTD., Shenzhen (CN)

(72) Inventors: Cong Zhao, Shenzhen (CN); Ji Wang, Shenzhen (CN); Zihong Liu, Shenzhen (CN)

(73) Assignee: SHENZHEN ROYOLE TECHNOLOGIES CO. LTD, Shenzhen, Guangdong (CN)

( * ) Notice: Subject to any disclaimer, the term of this patent is extended or adjusted under 35 U.S.C. 154(b) by 0 days.

(21) Appl. No.: 15/057,870

(22) Filed: Mar. 1, 2016

(65) Prior Publication Data
US 2016/0349521 A1 Dec. 1, 2016

Related U.S. Application Data

(63) Continuation of application No. PCT/CN2015/080319, filed on May 29, 2015.

(51) Int. Cl.
*G02B 27/01* (2006.01)
*G02B 27/00* (2006.01)

(52) U.S. Cl.
CPC ..... *G02B 27/0179* (2013.01); *G02B 27/0093* (2013.01)

(58) Field of Classification Search
CPC .................. G02B 27/0093; G02B 27/0179
USPC ......................................... 345/7–8, 156, 633
See application file for complete search history.

(56) References Cited

U.S. PATENT DOCUMENTS

| 5,572,361 A | 11/1996 | Kamiya et al. | |
| 5,737,012 A * | 4/1998 | Tabata | G02B 27/017 345/8 |
| 6,177,952 B1 * | 1/2001 | Tabata | G02B 27/017 348/47 |

(Continued)

FOREIGN PATENT DOCUMENTS

CN 103149690 A 6/2013

*Primary Examiner* — Tony Davis
(74) *Attorney, Agent, or Firm* — Morgan, Lewis & Bockius LLP

(57) ABSTRACT

This disclosure relates to display adjustment methods and head-mounted display devices. The head-mounted display device includes: first and second display modules; a first adjustment unit for triggering the first display module to enter a diopter adjustment mode and/or an interpupillary distance adjustment mode and for triggering the second display module to enter a non-adjustment mode; a confirmation unit for receiving a confirmation signal indicating that the first adjustment unit has completed the adjustment; a second adjustment unit for triggering the second display module to enter the diopter adjustment mode and/or the interpupillary distance adjustment mode and for triggering the first display module to enter the non-adjustment mode after the confirmation unit has received another confirmation signal. Independent display adjustment is achieved between the first and second display modules in the head-mounted display devices using the methods in this application, thereby providing an adjustment mode adapted for different user visions.

18 Claims, 5 Drawing Sheets

(56) References Cited

U.S. PATENT DOCUMENTS

| | | | | |
|---|---|---|---|---|
| 2002/0113755 | A1* | 8/2002 | Lee | G02B 7/12 345/7 |
| 2006/0072206 | A1* | 4/2006 | Tsuyuki | G02B 27/0172 359/631 |
| 2009/0097122 | A1* | 4/2009 | Niv | G02B 5/1866 359/575 |
| 2012/0069448 | A1* | 3/2012 | Sugihara | G02B 27/0176 359/643 |
| 2012/0092514 | A1* | 4/2012 | Vandame | G03B 13/06 348/222.1 |
| 2012/0098971 | A1* | 4/2012 | Hansen | H04N 5/2258 348/164 |
| 2012/0162764 | A1* | 6/2012 | Shimizu | H04N 13/044 359/473 |
| 2012/0293407 | A1* | 11/2012 | Lee | G02B 27/017 345/156 |
| 2013/0010358 | A1* | 1/2013 | Park | H04N 13/0452 359/464 |
| 2013/0050642 | A1* | 2/2013 | Lewis | A61B 3/113 351/204 |
| 2013/0170031 | A1* | 7/2013 | Bohn | G02B 27/2242 359/480 |
| 2013/0318776 | A1* | 12/2013 | Jacobs | G02B 27/01 29/592.1 |
| 2014/0307315 | A1* | 10/2014 | Bohn | G02B 27/0176 359/480 |
| 2014/0320972 | A1* | 10/2014 | Magyari | G02B 27/0172 359/630 |
| 2015/0035726 | A1* | 2/2015 | Li | G02B 27/0172 345/8 |
| 2015/0130599 | A1* | 5/2015 | Berkley | G08B 6/00 340/407.2 |
| 2015/0215610 | A1* | 7/2015 | Rousseau | H04N 13/0429 348/47 |
| 2016/0005231 | A1* | 1/2016 | Yamaga | G02B 7/12 345/633 |
| 2016/0309143 | A1* | 10/2016 | Fu | H04N 13/0497 |
| 2016/0323569 | A1* | 11/2016 | Wang | H04N 13/0472 |
| 2016/0334627 | A1* | 11/2016 | Yang | G02B 27/0176 |
| 2016/0379413 | A1* | 12/2016 | Yamamoto | G06T 19/006 345/427 |

* cited by examiner though, each individual person has different visions, and thus cannot have an optimal experience when using the head-mounted display device due to some problems such as myopia, hypermetropia or presbyopia and so on. It is hard for the user to determine whether the head-mounted display device has been adjusted to an optimal display status suitable for himself in the prior art.

DISPLAY ADJUSTMENT METHODS AND HEAD-MOUNTED DISPLAY DEVICES

RELATED APPLICATION

This application is a continuation application of PCT Patent Application No. PCT/CN2015/080319, entitled "DISPLAY ADJUSTMENT METHODS AND HEAD-MOUNTED DISPLAY DEVICES" filed on May 29, 2015, which is incorporated by reference in its entirety.

TECHNICAL FIELD

This disclosure relates to display adjustment techniques, and in particular to display adjustment methods and head-mounted display devices using the same.

BACKGROUND

A head-mounted display device, which is also called as a video glass, a glass-style displayer or a portable player, can play multimedia files including 3D videos, and use a near-eye display technique to enable an immersion theatre effect, thereby achieving a portable home theatre.

However, each individual person has different visions, and thus cannot have an optimal experience when using the head-mounted display device due to some problems such as myopia, hypermetropia or presbyopia and so on. It is hard for the user to determine whether the head-mounted display device has been adjusted to an optimal display status suitable for himself in the prior art.

It is needed to provide a head-mounted display device that overcomes such technical problems and improves a display adjustment operability.

SUMMARY OF THIS DISCLOSURE

In implementations of this disclosure, a head-mounted display device is provided, which includes:
  a first display module and a second display module;
  a first adjustment unit for triggering the first display module to enter a diopter adjustment mode and/or an interpupillary distance adjustment mode, and for triggering the second display module to enter a non-adjustment mode;
  a confirmation unit for receiving a confirmation signal indicating that the first adjustment unit has completed the adjustment(s); and
  a second adjustment unit for triggering the second display module to enter the diopter adjustment mode and/or the interpupillary distance adjustment mode and for triggering the first display module to enter the non-adjustment mode after the confirmation unit has received the confirmation signal.

A display adjustment method is also provided in this disclosure. This method is adapted for an electronic apparatus including a first display module and a second display module, where the method includes:
  triggering the first display module to enter a diopter adjustment mode and/or an interpupillary distance adjustment mode, and for triggering the second display module to enter a non-adjustment mode;
  receiving a confirmation signal indicating that the first display module has completed the adjustment(s); and
  triggering the second display module to enter the diopter adjustment mode and/or the interpupillary distance adjustment mode and the first display module into the non-adjustment mode according to confirmation signal.

Independent display adjustment between the first display module and the second display module can be achieved by alternately triggering one of the first display module and the second display module into the diopter adjustment mode and/or the interpupillary distance adjustment mode and for triggering the other one into the non-adjustment mode in the head-mounted display device and the display adjustment method of this disclosure. As such, an adjustment mode is provided to adapt for different user visions.

BRIEF DESCRIPTION OF THE DRAWINGS

Respective implementations in this disclosure are described in detail in combination with following figures. It should be understood that each component shown in the figures is not to represent its actual dimension and proportional relation, and those figures are merely used for clear illustration rather than limitation to this disclosure.

DETAILED DESCRIPTION

In order to understand objectives, technical solutions and advantages of this disclosure more clearly, this disclosure will be further described in detail with reference to multiple implementations and figures. It should be understood that those specific implementations described herein are merely for explaining rather than limiting this disclosure.

Figure 1:
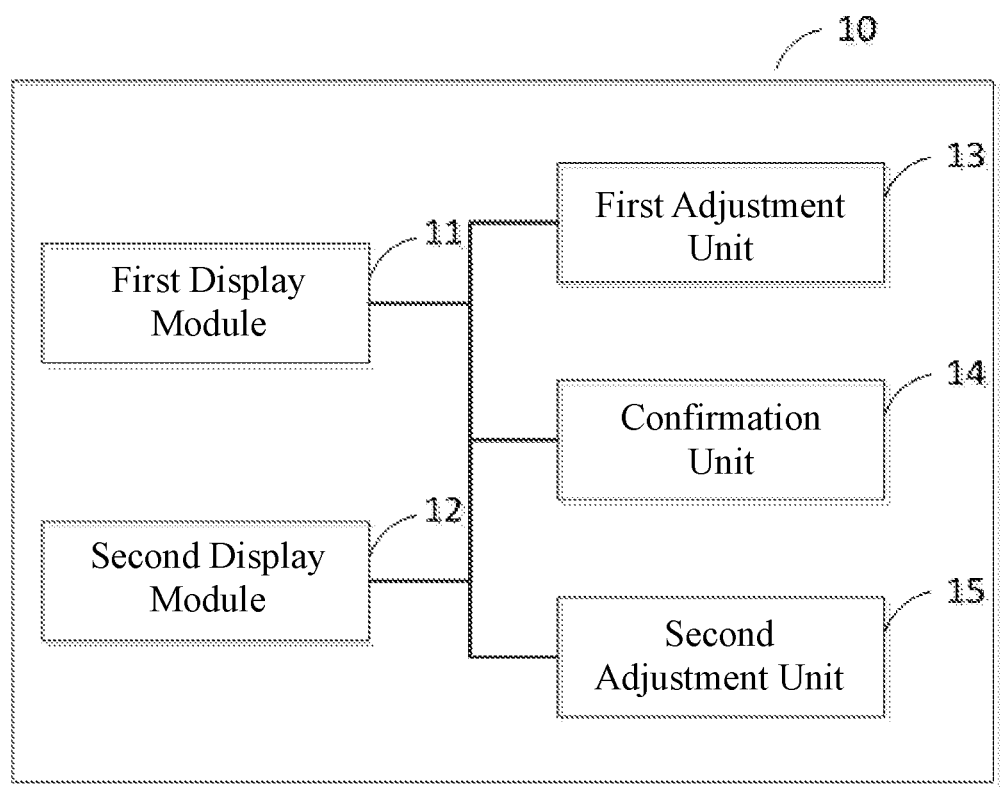
FIG. 1 is a block diagram for a head-mounted display device according to a first embodiment of this disclosure.

FIG. 1 is a block diagram for a head-mounted display device according to a first embodiment of this disclosure. The head-mounted display device 10 includes: a first display module 11 and a second display module 12.

The two display modules are respectively used for providing display contents for a user's eyes. Specifically, each display module, i.e., the first display module 11 and the second display module 12, respectively includes a set of micro-display apparatus and an optical module (not shown). Here, the micro-display apparatus is movably connected to one corresponding optical module; that is, a distance between the micro-display apparatus and its corresponding optical module can be adjusted. Images generated by the micro-display apparatuses of the two display modules are respectively projected by their corresponding optical module to a left eye and a right eye of the user in a predetermined direction, and thus the user can see a magnified virtual image for the display contents of the micro-display apparatuses.

A first adjustment unit 13 is used for triggering the first display module 11 to enter a diopter adjustment mode and/or an interpupillary distance adjustment mode, and for triggering the second display module 12 to enter a non-adjustment mode.

Specifically, the diopter adjustment mode and/or the interpupillary distance adjustment mode can be flexibly provided according to specific mechanism arrangements of the head-mounted display device 10. That is, the head-mounted display device 10 can only adjust a diopter or an interpupillary distance; alternatively, the head-mounted display device can adjust both the diopter and the interpupillary distance. In this embodiment, when the display module is in the interpupillary distance adjustment mode, its location can be moved according to the arrangement of the above-described optical module to adjust the interpupillary distance, and accordingly, one eye corresponding to this display module can see the display content of the display module normally, which includes that the user can see the whole content and one of his pupils corresponds to a center of the content. When the display module is in the diopter adjustment mode, a distance between the micro-display apparatus and its corresponding optical module within the display module is modified to adjust the diopter in this display module. Specifically, an electric motor can be used as a power source to modify the location of the display module and to modify the distance between the micro-display apparatus and its corresponding optical module. A power-driven motor is ordinarily known in the prior art, and thus specific description thereof is omitted here. In some other implementations, the user can perform such adjustment through corresponding manual operation(s). The non-adjustment mode, which specifically includes, but is not limited to, black screen, shut-down of display output and shut-down of power output, can ensure an independent calibration for the display module in the adjustment mode.

A confirmation unit 14 is used to receive a confirmation signal indicating that the first adjustment unit 13 has completed the adjustment(s).

Specifically, when the first adjustment unit 13 has adjusted the first display module 11, the confirmation unit 14 can initiate subsequent operations after receiving a confirmation signal indicating a completion of the adjustment(s). Confirmation signal can be triggered through a physical button or a touch control board. Confirmation signal can also be triggered through a voice input, where the head-mounted display device correspondingly includes a voice input apparatus such as a microphone in this case. After receiving a voice command from the user who has completed the adjustment, the head-mounted display device determines whether there is a confirmation signal according to the voice command received through the microphone, where the confirmation signal can be a predetermined voice command in the system or a user-defined voice command recorded in advance. When the voice command received by the microphone is matched with that of a confirmation signal, the confirmation signal is triggered. Also, the user's eye expression or facial expression can be captured through a camera, and it is determined whether the captured expression is matched with a predetermined eye expression feature or a facial expression feature for confirmation signal. Confirmation signal is triggered when the expression is matched.

After the confirmation unit 14 receives the confirmation signal, a second adjustment unit 15 is used for triggering the second display module 12 to enter the diopter adjustment mode and/or the interpupillary distance adjustment mode, and for triggering the first display module 11 to enter the non-adjustment mode.

Independent display adjustment between the first display module 11 and the second display module 12 can be achieved by alternately triggering one of the first display module 11 and the second display module 12 to enter the diopter adjustment mode and/or the interpupillary distance adjustment mode and for triggering the other one to enter the non-adjustment mode in the head-mounted display device 10 in the first embodiment of this disclosure. As such, it is convenient for the user to determine whether his eyes have been arranged with proper diopter and interpupillary distance, thereby improving a display adjustment operability of the head-mounted display device.

Figure 2:
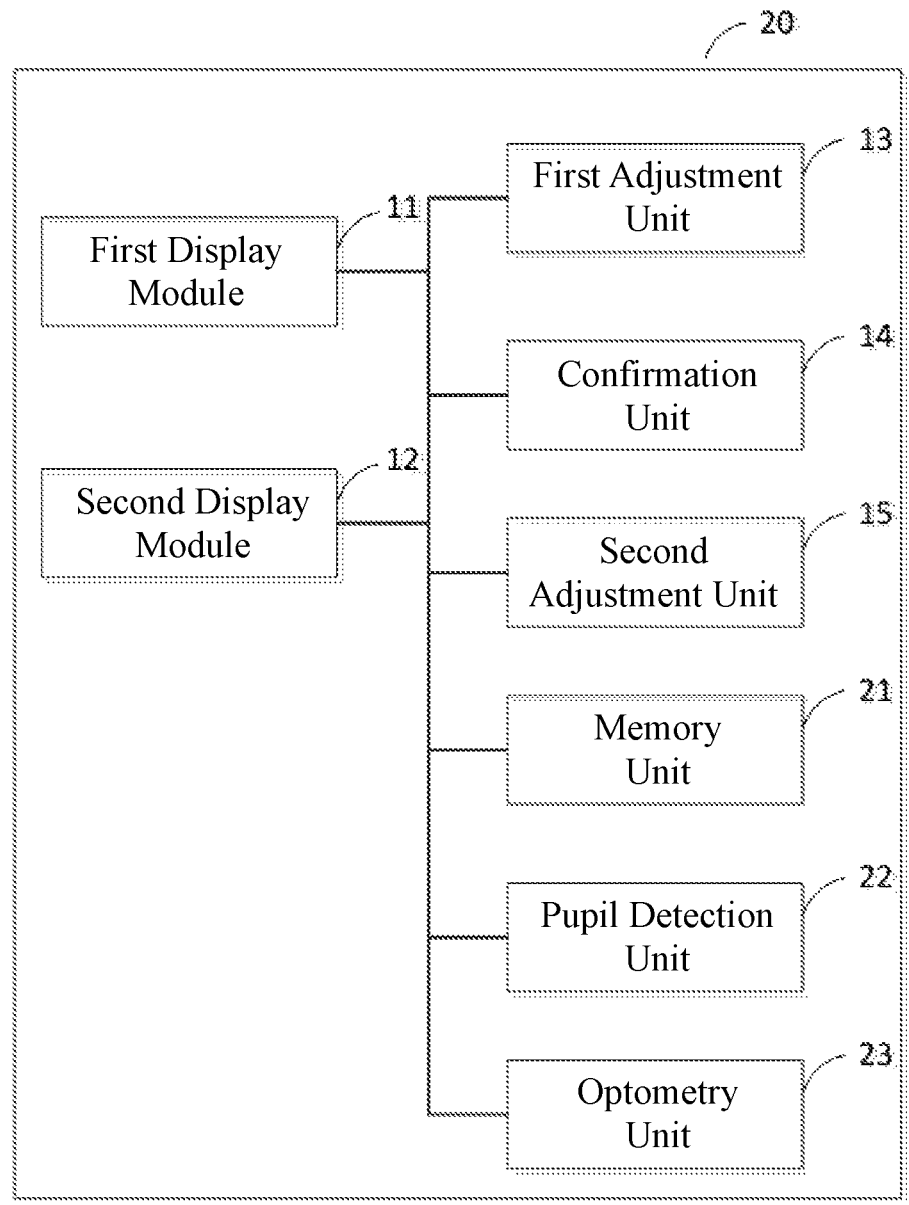
FIG. 2 is a block diagram for a head-mounted display device according to a second embodiment of this disclosure.

FIG. 2 is a block diagram for a head-mounted display device according to a second embodiment of this disclosure. The head-mounted display device 20 further includes a memory unit 21 for storing a diopter calibration interface and/or an interpupillary distance calibration interface in addition to the head-mounted display device 10 in the first embodiment.

In a first implementation, the head-mounted display device 20 is merely provided with the diopter adjustment mode, and the entry of the diopter adjustment mode and/or the interpupillary distance adjustment mode refers to: entering the diopter adjustment mode by retrieving and outputting the diopter calibration interface for display. Specifically, the first adjustment unit 13 and the second adjustment unit 15 respectively trigger the first display module 11 and the second display module 12 to display the diopter calibration interface, such that the user can determine whether both eyes have a clear sight using the diopter calibration interface provided by the display modules in the diopter adjustment mode. Assuming that there is unclear sight, a diopter adjustment mechanism can be manually adjusted aiming at the distance between the micro-display apparatus of the display module and the optical module corresponding to micro-display apparatus, where a diopter calibration is not completed for the eyes until the diopter calibration interface can be seen clearly.

In a second implementation, the head-mounted display device 20 is merely provided with the interpupillary distance adjustment mode, and the entry of the diopter adjustment mode and/or the interpupillary distance adjustment mode refers to: entering the interpupillary distance adjustment mode by retrieving and outputting the interpupillary distance calibration interface for display. Specifically, the first adjustment unit 13 and the second adjustment unit 15 respectively trigger the first display module 11 and the second display module 12 to display the interpupillary distance calibration interface, such that the user can use the interpupillary distance calibration interface provided by the display modules in the interpupillary distance adjustment mode to determine whether his eyes have a normal sight of the display contents of the display modules, including that the eyes can see the complete contents and the pupil of each eye corresponds to the center of each content. Assuming that there is abnormal sight, an interpupillary distance adjustment mechanism can be manually adjusted to modify the location of the display module(s), and an interpupillary distance calibration is not completed for the eye(s) until the interpupillary distance calibration interface can be seen normally.

In a third implementation, the head-mounted display device 20 is provided with both the interpupillary distance adjustment mode and the diopter adjustment mode, and the entry of the diopter adjustment mode and/or the interpupillary distance adjustment mode refers to: entering the interpupillary distance adjustment mode and the diopter adjustment mode by first retrieving and outputting the interpupillary distance calibration interface for display, which can be performed in accordance with the above-described implementation. After the display module in the adjustment mode confirms the completion of the interpupillary distance calibration, the diopter calibration interface can be retrieved and outputted for display, and the diopter calibration is further carried out for this display module using the corresponding diopter calibration interface. In some other implementations, the diopter calibration interface can be first retrieved and outputted for display, and then the interpupillary distance calibration interface is retrieved and outputted for display after confirming a completion of the diopter calibration.

In a fourth implementation, the head-mounted display device 20 also includes a pupil detection unit 22. In this case, the entry of the interpupillary distance adjustment mode includes:

detecting pupil location data for the user by the pupil detection unit 22 and transforming the pupil location data into an adjustment parameter; and changing the display module(s) to adjust its/their location(s) according to the adjustment parameter.

Specifically, the adjustment parameter refers to a parameter that is transformed according to the pupil location data to adjust the location(s) of the display module(s) to an adaptive location, where the adaptive location can enable a center of a display image provided by each display module to align with a pupil center of one corresponding eye. In this way, the power source such as the electric motor can be changed according to the adjustment parameter, so as to change the display module(s) to be adjusted to the adaptive location in an automatic way.

In this implementation, when the head-mounted display device 20 has adjusted the location(s) of the display module(s) according to the adjustment parameter, the head-mounted display device can automatically receive a confirmation signal indication of the completion of the interpupillary distance adjustment, and accordingly a next operation can be started automatically. For example, the first adjustment unit 13 triggers the first display module 11 to enter the diopter adjustment mode, and triggers the second display module 12 to enter the non-adjustment mode. After the confirmation unit 14 receives a confirmation signal indicating that the first adjustment unit 13 has ended the diopter adjustment, the second adjustment unit 15 triggers, according to confirmation signal, the second display module 12 into the diopter adjustment mode and the first display module 11 into the non-adjustment mode.

In a fifth implementation, the head-mounted display device 20 also includes an optometry unit 23, and the entry of the diopter adjustment mode and/or the interpupillary distance adjustment mode includes: detecting diopter optometry data and/or interpupillary distance optometry data for the user using the optometry unit 23, and transforming those data into an adjustment parameter; and changing the display module(s) for adjustment according to the adjustment parameter.

Automatic optometry is a well-known prior art, and thus specific description thereof is omitted here.

When considering the above-described implementations respectively, the first adjustment unit 13 is deemed to complete the adjustment when one of the above-described calibration modes has been performed for the first display module 11 by the first adjustment unit 13, the confirmation unit 14 receives a confirmation signal indicating that the first adjustment unit 13 has completed the adjustment, and then a same calibration mode is performed for the second display module 12 by the second adjustment unit 15.

In accordance with the first implementation, when the first adjustment unit 13 and the second adjustment unit 15 have respectively completed the adjustment for the diopter calibration, the confirmation unit 14 can also be used for: receiving a confirmation signal which indicates the second adjustment unit 15 has completed the adjustment; and triggering the first adjustment unit 13 and the second adjustment unit 15 to start the interpupillary distance adjustment mode.

In this implementation, when the first display module 11 and the second display module 12 respectively corresponding to the left eye and the right eye have respectively completed the adjustment for the diopter calibration, the first adjustment unit 13 and the second adjustment unit 15 can start the interpupillary distance adjustment mode simultaneously. That is, the first display module 11 and the second display module 12 simultaneously display the interpupillary distance calibration interface.

The head-mounted display device provided in the second embodiment of this disclosure provides multiple adjustment modes, and can be set flexibly to further adapt for features and application conditions of different head-mounted display devices.

Figure 3:
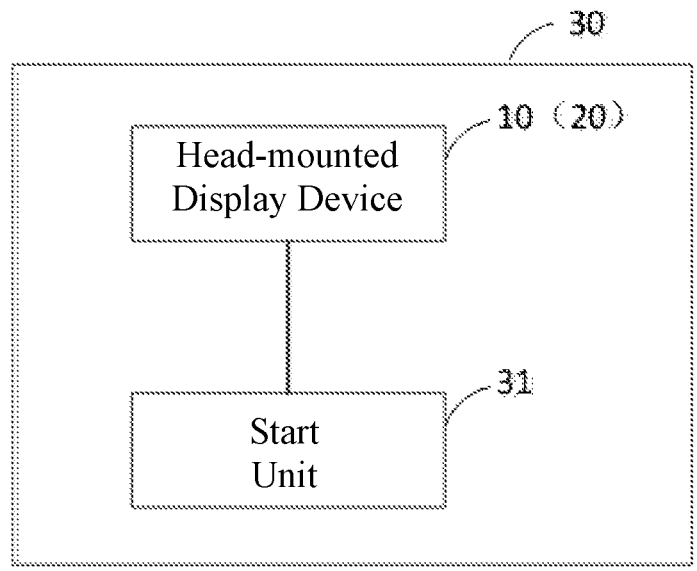
FIG. 3 is a block diagram for a head-mounted display device according to a third embodiment of this disclosure.

FIG. 3 is a block diagram for a head-mounted display device according to a third embodiment of this disclosure. In addition to the head-mounted display devices 10 or 20 in the above-described embodiments, the head-mounted display device 30 further includes: a start unit 31 for triggering the first adjustment unit 13 when the head-mounted display device 30 has been powered on.

Preferably, the start unit 31 can further retrieve and output a start video and/or a start audio before triggering the first adjustment unit 13. The start video and/or the start audio can be pre-stored in the memory unit 21.

The confirmation unit 14 is also used for: receiving a confirmation signal indicating that both the first adjustment unit 13 and the second adjustment unit 15 have completed the adjustment; and triggering the first display module 11 and the second display module 12 to enter a normal operation mode.

The head-mounted display device specifically includes but is not limited to head-mounted video player, head-mounted game player, head-mounted navigation device or head-mounted medical display apparatus. Correspondingly, the normal operation mode corresponds to a main routine of the head-mounted display device. In an example, entering the normal operation mode refers into a home page for the head-mounted video player.

The head-mounted display device provided in the third embodiment of this disclosure can cooperate with a startup flow so as to guide the user when it is the first time for the user to use the head-mounted display device, thereby providing an optimal operation status for the user.

Figure 4:
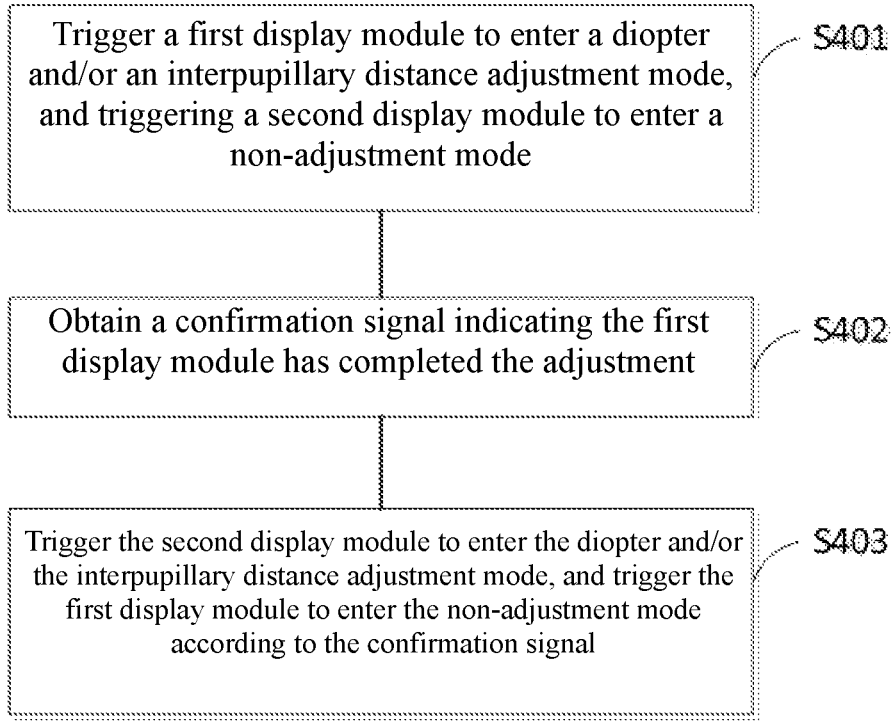
FIG. 4 is a flow chart for a display adjustment method according to a fourth embodiment of this disclosure.

FIG. 4 is a flow chart for a display adjustment method according to a fourth embodiment of this disclosure. This method can be applied to an electronic apparatus including a first display module and a second display module, where the electronic apparatus includes but is not limited to a head-mounted display device. The method 400 includes following steps.

In S401, the first display module is triggered to enter a diopter adjustment mode and/or an interpupillary distance adjustment mode, and the second display module is triggered to enter a non-adjustment mode.

In S402, a confirmation signal is received, which indicates that the first display module has completed the adjustment.

In S403, the second display module is triggered to enter the diopter adjustment mode and/or the interpupillary distance adjustment mode and the first display module is triggered to enter the non-adjustment mode according to confirmation signal.

Independent display adjustment between the first display module and the second display module can be achieved by alternately triggering one of the first display module and the second display module into the diopter adjustment and/or the interpupillary distance adjustment mode and for triggering the other one into the non-adjustment mode in the display adjustment method provided in the fourth embodiment of this disclosure. As such, an adjustment mode is provided to adapt for different user visions.

Figure 5:
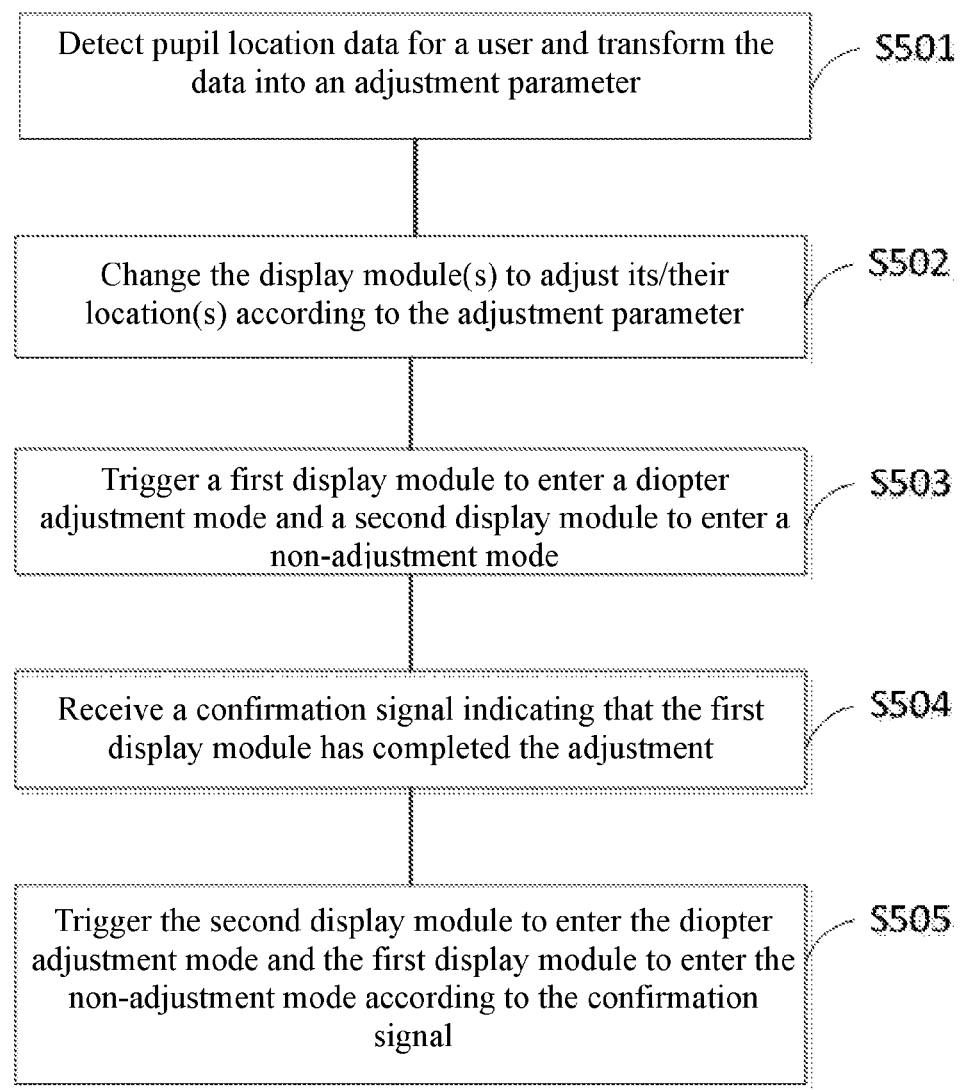
FIG. 5 is a flow chart for a display adjustment method according to a fifth embodiment of this disclosure.

FIG. 5 is a flow chart for a display adjustment method according to a fifth embodiment of this disclosure. The method 500 includes following steps.

In S501, pupil location data are detected for a user and the pupil location data is transformed into an adjustment parameter.

In S502, location(s) of display module(s) is/are adjusted according to the adjustment parameter.

The pupil location data can be simultaneously detected for user's eyes in the detection step; the locations of the first display module and the second display module are automatically driven, e.g., by an electric motor, so that each pupil center of a left eye and a right eye of a user respectively corresponds to each center of the first display module and the second display module, or to each center of a display image respectively displayed by the first display module and the second display module. In some other implementations, the pupil location data can be respectively detected for the left eye and the right eye of the user, and then the display modules are respectively driven to adjust their locations. Alternatively, the pupil location data can be respectively detected for the left eye and the right eye of the user, and then the two display modules are simultaneously driven to adjust their locations.

In S503, the first display module is triggered to enter a diopter adjustment mode and the second display module is triggered to enter a non-adjustment mode.

In S504, a confirmation signal is received, which indicates that the first display module has completed the adjustment.

In S505, the second display module is triggered to enter the diopter adjustment mode and the first display module is triggered to enter the non-adjustment mode according to confirmation signal.

In some other implementations, entering the diopter adjustment mode and/or an interpupillary distance adjustment mode can also be achieved as follows: detecting diopter optometry data and/or interpupillary distance optometry data for the user, and transforming those data into an adjustment parameter; and changing the display module(s) to adjust its/their location(s) according to the adjustment parameter. Specific implementation can be referred to the fifth implementation in the second embodiment.

The display adjustment method provided in the fifth embodiment of this disclosure can further detect the pupil location data for the user automatically and transform these data into the pupil adjustment parameter by which the interpupillary distance can be adjusted in an automatic manner.

Figure 6:
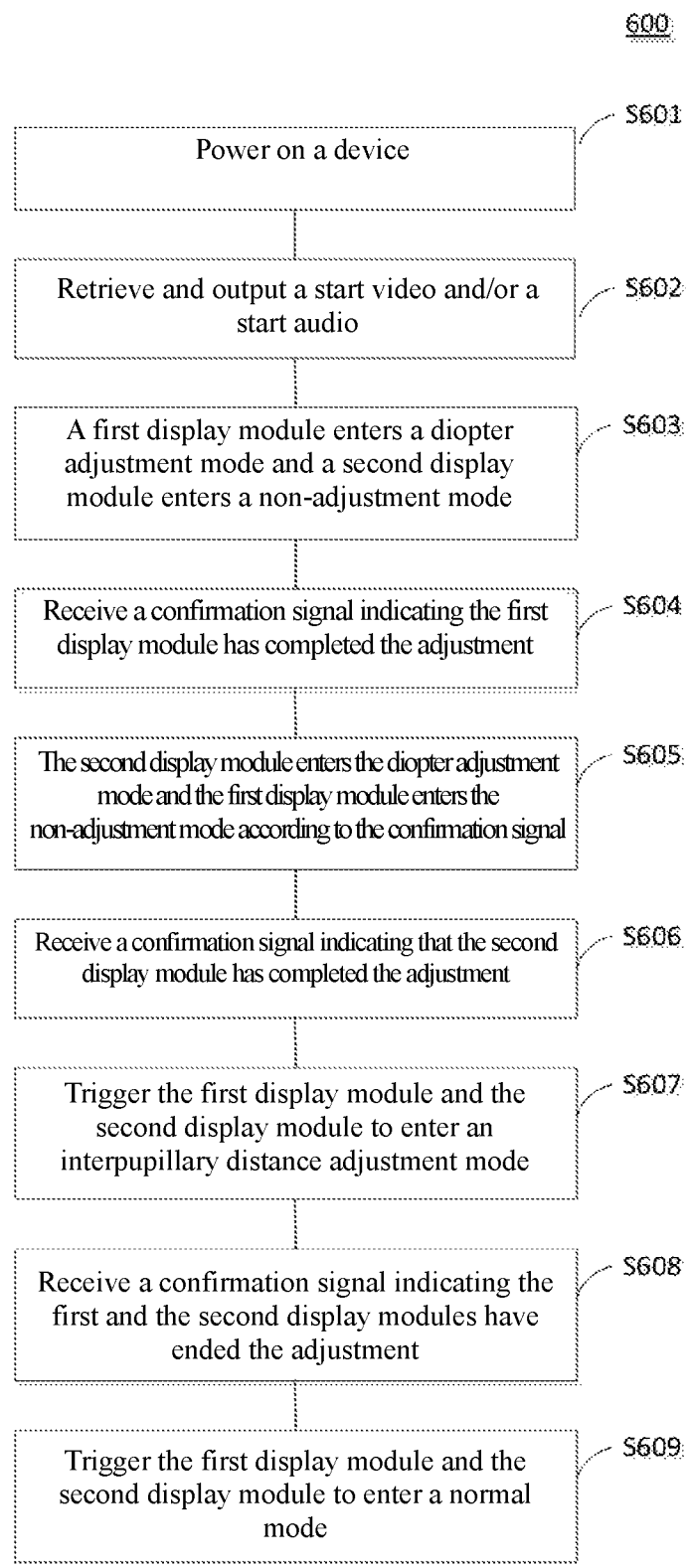
FIG. 6 is a flow chart for a display adjustment method according to a sixth embodiment of this disclosure.

FIG. 6 is a flow chart for a display adjustment method according to a sixth embodiment of this disclosure. The method 600 includes following steps.

In S601, a head-mounted display device is powered on.

In S602, a start video and/or a start audio is retrieved and outputted.

In S603, a first display module enters a diopter adjustment mode, and a second display module enters a non-adjustment mode.

In S604, a confirmation signal is received, which indicates the first display module has completed the adjustment.

In S605, the second display module is triggered to enter the diopter adjustment mode and the first display module is triggered to enter the non-adjustment mode according to confirmation signal.

In S606, a confirmation signal is received, which indicates the second display module has completed the adjustment.

In S607, the first display module and the second display module are triggered to enter an interpupillary distance adjustment mode.

In S608, a confirmation signal is received, which indicates the first and the second display modules have completed the adjustment.

In S609, the first display module and the second display module are triggered to enter a normal operation mode.

The display adjustment method provided in the sixth embodiment of this disclosure can cooperate with a startup flow so as to guide the user when it is the first time for the user to use the head-mounted display device, thereby providing an optimal operation status for the user.

The methods in the fourth to sixth embodiments correspond to those features of the above-described head-mounted display devices, and thus specific principles can refer to those from the first to the third embodiments rather than be repeated here.

Those described above are merely preferred implementations rather than limitations of this disclosure. Any modification, equivalent replacement and improvement falling within the spirit and principle of this disclosure should be included in the scope of protection of this disclosure.

What is claimed is:
1. A head-mounted display device, comprising:
a first display module and a second display module;
a first adjustment unit and a second adjustment unit;
a confirmation unit; and
a processor, wherein the first adjustment unit, the second adjustment unit and the confirmation unit are connected to and controlled by the processor;
wherein:
the first adjustment unit is configured to enable the first display module to enter a first diopter adjustment mode while enabling a second display module to enter a non-adjustment mode;
the confirmation unit is configured to receive a first confirmation signal indicating that a first diopter adjustment of the first display module by the first adjustment unit is completed;
after the confirmation unit receives the first confirmation signal, the second adjustment unit is configured to enable the second display module to enter a second diopter adjustment mode while enabling the first display module to enter the non-adjustment mode;
the confirmation unit is configured to receive a second confirmation signal indicating that a second diopter adjustment of the second display module by the second adjustment unit is completed; and
after the confirmation unit receives the second confirmation signal, at least one of the first adjustment unit and the second adjustment unit, is configured to enable a corresponding one of the first display module and the second display module to enter an interpupillary distance adjustment mode while enabling the other one of the first display module and the second display module to enter the non-adjust mode.

2. The head-mounted display device of claim 1, further comprising a memory unit configured for storing at least one of a diopter calibration interface and an interpupillary distance calibration interface.

3. The head-mounted display device of claim 2, wherein the first adjustment unit is configured for retrieving and rendering the diopter calibration interface at the first diopter adjustment mode.

4. The head-mounted display device of claim 2, wherein the first adjustment unit is configured for retrieving and displaying the interpupillary distance calibration interface at the interpupillary distance adjustment mode.

5. The head-mounted display device of claim 2, wherein the first adjustment unit is configured for at least one of:
retrieving and rendering the interpupillary distance calibration interface at the interpupillary distance adjustment mode; and
retrieving and rendering the diopter calibration interface at the first diopter adjustment mode.

6. The head-mounted display device of claim 1, further comprising a pupil detection unit configured for detecting pupil location data of a user, wherein
the first adjustment unit is configured for, at the interpupillary distance adjustment mode, transforming the pupil location data into an interpupillary distance adjustment parameter and changing a location of the first display module according to the interpupillary distance adjustment parameter.

7. The head-mounted display device of claim 1, further comprising an optometry unit configured for detecting diopter optometry data and interpupillary distance optometry data of a user, wherein the first adjustment unit is configured for transforming the diopter optometry data and the interpupillary distance optometry data into an interpupillary distance adjustment parameter and changing a location of the first display module according to the interpupillary distance adjustment parameter.

8. The head-mounted display device of claim 1, further comprising a start unit configured for activating the first adjustment unit after the head-mounted display device is powered on.

9. The head-mounted display device of claim 8, wherein the start unit is further configured for retrieving and outputting at least one of a start video and a start audio before activating the first adjustment unit.

10. The head-mounted display device of claim 1, wherein the confirmation unit is further configured for enabling the first adjustment unit and the second adjustment unit to enter a normal operation mode.

11. The head-mounted display device of claim 1, wherein the at least one of the first adjustment unit and the second adjustment unit, being configured to enable a corresponding one of the first display module and the second display module to enter an interpupillary distance adjustment mode while enabling the other one of the first display module and the second display module to enter the non-adjust mode, comprises:
the first adjustment unit is configured to enable the first display module to enter the interpupillary distance adjustment mode while enabling the second display module to enter the non-adjustment mode;
the confirmation unit is configured to receive a third confirmation signal indicating that a first interpupillary distance adjustment of the first display module by the first adjustment unit is completed;
after the confirmation unit receives the third confirmation signal, the second adjustment unit is configured to enable the second display module to enter the interpupillary distance adjustment mode while enabling the first display module to enter the non-adjustment mode; and
the confirmation unit is configured to receive a fourth confirmation signal indicating that a second interpupillary distance adjustment of the second display module by the second adjustment unit is completed.

12. A display adjustment method performed by an electronic device including a first display module and a second display module, comprising:
enabling, by a first adjustment unit, the first display module to enter a first diopter adjustment mode while enabling a second display module to enter a non-adjustment mode;
receiving a first confirmation signal indicating that a first diopter adjustment of the first display module by the first adjustment unit is completed;
after receiving the first confirmation signal, enabling, by a second adjustment unit, the second display module to enter a second diopter adjustment mode while enabling the first display module to enter the non-adjustment mode;
receiving a second confirmation signal indicating that a second diopter adjustment of the second display module by the second adjustment unit is completed; and
after receiving the second confirmation signal, enabling, by at least one of the first adjustment unit and the second adjustment unit, a corresponding one of the first display module and the second display module to enter an interpupillary distance adjustment mode while enabling the other one of the first display module and the second display module to enter the non-adjust mode.

13. The method of claim 12, wherein the entry of a diopter adjustment mode further comprises:
retrieving and displaying a diopter calibration interface.

14. The method of claim 12, wherein the entry of the interpupillary distance adjustment mode further comprises:
retrieving and rendering an interpupillary distance calibration interface.

15. The method of claim 12, wherein the first adjustment unit is configured for at least one of:
retrieving and rendering an interpupillary distance calibration interface at the interpupillary distance adjustment mode; and
retrieving and rendering a diopter calibration interface at the first diopter adjustment mode.

16. The method of claim 12, wherein the entry of the interpupillary distance adjustment mode further comprises:
detecting pupil location data of a user;
transforming the pupil location data into an interpupillary distance adjustment parameter; and
changing a location of the first display module according to the interpupillary distance adjustment parameter.

17. The method of claim 12, further comprising:
detecting diopter optometry data and interpupillary distance optometry data of a user;
transforming the diopter optometry data and the interpupillary distance optometry data into an interpupillary distance adjustment parameter; and
changing locations of the first display module and the second display module according to the interpupillary distance adjustment parameter.

18. The method of claim 12, wherein the enabling, by at least one of the first adjustment unit and the second adjustment unit, a corresponding one of the first display module and the second display module to enter an interpupillary distance adjustment mode while enabling the other one of the first display module and the second display module to enter the non-adjust mode, comprises:
- enabling, by the first adjustment unit, the first display module to enter the interpupillary distance adjustment mode while enabling the second display module to enter the non-adjustment mode;
- receiving, by the confirmation unit, a third confirmation signal indicating that a first interpupillary distance adjustment of the first display module by the first adjustment unit is completed;
- after the confirmation unit receives the third confirmation signal, enabling, by the second adjustment unit, the second display module to enter the interpupillary distance adjustment mode while enabling the first display module to enter the non-adjustment mode; and
- receiving, by the confirmation unit, a fourth confirmation signal indicating that a second interpupillary distance adjustment of the second display module by the second adjustment unit is completed.

* * * * *